United States Patent [19]

Hütter et al.

[11] Patent Number: 4,684,010
[45] Date of Patent: Aug. 4, 1987

[54] VIBRATING CONVEYOR WITH VIBRATION ISOLATION

[75] Inventors: Odo Hütter, Kirchheim/T.; Rainer Jung, Eberdingen, both of Fed. Rep. of Germany

[73] Assignee: Robert Bosch GmbH, Stuttgart, Fed. Rep. of Germany

[21] Appl. No.: 815,786

[22] Filed: Jan. 3, 1986

Related U.S. Application Data

[63] Continuation of Ser. No. 580,541, Feb. 15, 1984, abandoned.

[30] Foreign Application Priority Data

Feb. 15, 1983 [DE] Fed. Rep. of Germany ....... 3305166

[51] Int. Cl.⁴ .............................................. B65G 27/08
[52] U.S. Cl. ...................................... 198/765; 267/141
[58] Field of Search ............... 198/756, 757, 760, 765, 198/767; 267/141, 141.7, 153

[56] References Cited

U.S. PATENT DOCUMENTS

| | | | |
|---|---|---|---|
| 1,800,489 | 4/1931 | Wilson | 198/765 |
| 2,819,063 | 1/1958 | Neidhart | 267/141 |
| 3,032,174 | 5/1962 | Lake et al. | 198/757 |
| 3,123,203 | 3/1964 | Baker | 198/765 |
| 3,171,538 | 3/1965 | Hagenbook | 198/757 |
| 3,347,352 | 10/1967 | Gwinn | 198/765 |
| 3,658,172 | 4/1972 | Hacker | 198/760 |

Primary Examiner—Joseph E. Valenza
Attorney, Agent, or Firm—Michael J. Striker

[57] ABSTRACT

A vibrating conveyor has a working mass drivable in vibrations, a counter mass which is also driven via the working mass in vibrations which are transferred to a support or a mounting base, and a device for dampening or reducing this transmission which includes a plurality of roller bearing elements provided between the vibrating conveyor and a mounting base and each formed as a unit including two bearing shells with running tracks and at least one roller part between the running tracks, wherein the running tracks before and after the roller part is inclined in opposite direction in form of a predetermined curve, and when the counter mass is driven in rotation the counter mass and the mounting base are pressed from one another by the roller bearing element which results in damping relative to the mounting base.

7 Claims, 4 Drawing Figures

U.S. Patent  Aug. 4, 1987  4,684,010
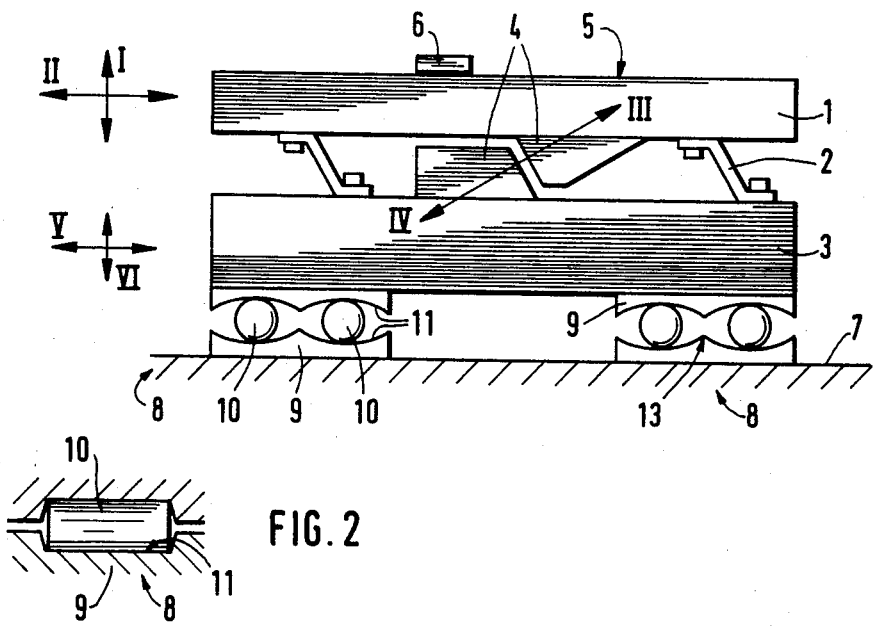
FIG. 1
FIG. 2
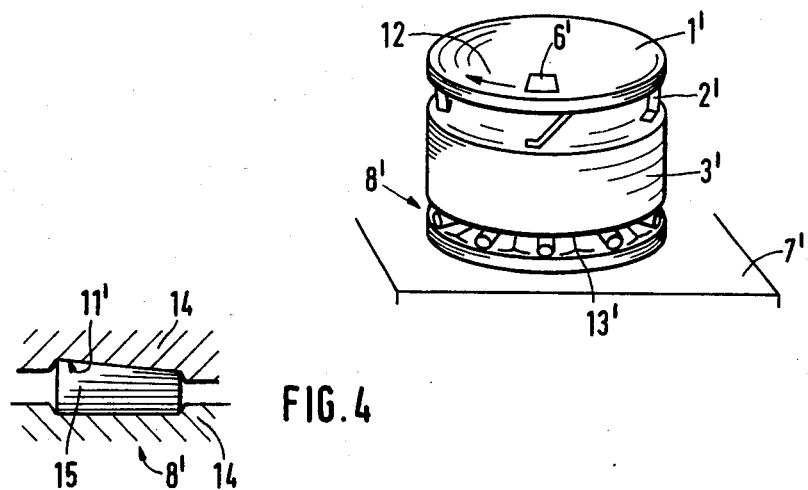
FIG. 3
FIG. 4

VIBRATING CONVEYOR WITH VIBRATION ISOLATION

This is a continuation of application Ser. No. 580,541, filed Feb. 15, 1984, now abandoned.

BACKGROUND OF THE INVENTION

The present invention relates to a vibrating conveyor. More particularly, it relates to a vibrating conveyor which has a working mass which is driven in vibration and has a conveying surface for supporting a workpiece to be conveyed, a drive system which drives the working mass in vibrations, a counter mass connected with the working mass via springs or other links, an accumulating element for vibration energy, and a device provided between the counter mass and a mounting base for vibration isolation and/or damping.

Vibrating conveyors of the above general type are known in the art. The counter mass which conventionally is formed by a masive housing body (base body) of the conveyor is considerably greater than the working mass. The workpiece which lies on the conveying channel of the working mass is taken along the prestroke movement in the conveying direction; however, the working mass does not perform the return stroke. The working mass and the counter mass vibrate necessarily in the opposite direction, so that in the event of a great counter mass on the vibrating conveyor disturbing vibrations transfer to the surrounding are unavoidable. Such vibrations are especially undesirable when the mounting base are driven by the disturbing vibrations also into vibrations or possibly the disturbing vibrations are amplified. This can be the case when the mounting base serves as a housing of a further device which belongs to a manufacturing installation. Such disturbing vibrations can lead to considerable noise generation and cause a main problem for the use of the vibrating conveyors.

In the known vibrating conveyors of this type a rubber buffer is arranged between the counter mass and the mounting base so as to serve as a damping device. The rubber buffer is formed for example as a vibration mount. These rubber buffers have, however, only a very limited damping capacity, since it depends on the shore hardness of the material. Because the required exact position retention of such swinging conveyor or because of the required force takeup in vertical direction, this hardness is limited.

SUMMARY OF THE INVENTION

Accordingly, it is an object of the present invention to provide a vibrating conveyor of the above-mentioned general type which avoids the disadvantages of the prior art.

More particularly, it is an object of the present invention to provide a vibrating conveyor which avoids the disadvantages of the prior art.

In keeping with these objects and with others which will become apparent hereinafter, one feature of the present invention resides, briefly stated, in a vibrating conveyor in which means between a counter mass and a mounting base for vibration isolation and/or damping includes a plurality of roller bearing elements formed as units each including two bearing shells with running tracks and at least one roller part between the running tracks, whose free running is limited in a narrow region around a point of equilibrium by horizontally acting forces which increase with increased distance of the rolling part from the point of equilibrium.

When the vibrating conveyor is designed in accordance with the present invention, a free vibration of the working mass and the counter mass is possible and moreover, at least in a horizontal movement direction, an approximately complete isolation of the vibration of the system "working- and counter mass" relative to the mounting base can be attained. The mounting or the vibrating conveyor is thereby selectable freely from the properties of the mounting base.

In accordance with the invention, the vibrations of the working mass and counter mass of the conveyor are clearly determined and computable. Since the mounting base forms its own vibrating mass, it is avoided that a completely correctly computed vibrating conveyor will have during use other properties then originally. Also, the use of aditionally coupled spring mass system does not bring the stamping and isolating result as the inventive vibrating conveyor in which at least in horizontal movement direction an approximately complete isolation of the vibrations of the vibrating system working- and counter mass relative to the surrounding is obtained.

The proposed roller bearing elements provide not only the good swinging isolation, but also an exact positioning of the conveying vibrator in the manufacturing system in which it is integrated as a part of a structural group.

In accordance with an advantageous embodiment of the invention, the shells, the running tracks and/or the roller parts are composed of an elastic material, preferably of rubber. For retaining the wear as low as possible, this material must be relatively hard. Because of the elasticity the running noise is considerably reduced and the increased compression at the point of the running direction reverse is elastically abosorbed or deepened.

In accordance with an additional embodiment of the invention, each unit is provided with two roller parts between which the running track has a raised formation inclined from this running track to another running track. In such construction the damping bearing can take up high loads. For providing a respective standing stability, at least the bearings per swinging conveyor must be arranged. The number of the bearing units to be used depends upon the support and structural design of the vibrating conveyor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view of a linear vibrating conveyor in accordance with a first embodiment of the present invention;

FIG. 2 is a roller bearing element in section on an enlarged scale, of the inventive vibrating conveyor;

FIG. 3 is a view showing a rotary vibrating conveyor in a perspective view in accordance with the second embodiment of the prsent invention; and FIG. 4 is a view showing a bearing element for the rotary vibrating conveyor of the second embodiment, in a section on enlarged scale.

DESCRIPTION OF A PREFERRED EMBODIMENT

FIG. 1 shows a side view of a linear vibrating conveyor in accordance with the present invention, in which a working mass 1 is coupled with a counter mass 3 by flat spring 2. A vibration drive 4 is provided between the working mass 1 and the counter mass 3 and can be formed, for example as an electromagnetic drive. By intermittent energizing of the drive 4 via a not shown control device, the working mass is positively displaced through the flat springs 2 in a vertical movement I and a horizontal movement II. During the movement directed to the left and downwardly, the reverse movement is normally produced via the flat springs which serve as an energy accumulator. A conveying surface 5 is provided on the working mass 1 so that a workpiece 6 can be conveyed on it. For the conveying direction, the vibrating direction is decisive which is identified with the reference numerals III and IV. The arrow III extending inclined upwardly identifies the direction which the workpiece is conveyed.

The counter mass is considerably greater than the working mass so that on the counter mass considerably smaller deflections take place, as can be seen from the comparison of the arrows 5 and 6. The ratio of the counter mass and the working mass can amount to about 10:1 as is conventional. Since this is a vibration system which deals with compensating forces, the vibrations of the working mass and the counter mass are directed respectively one against the other.

Despite the fact that the vibrations of the counter mass in considerably smaller than the vibrations of the working mass a transmission of this residual vibrations as disturbing vibrations to a mounting base 7 is unavoidable. The mounting base 7 can be formed as a massive body. It can be also formed, however, as a structural device with the aid of which the swinging conveyor is integrated in a manufacturing installation.

For obtaining an optimal vibration damping between the counter mass and the mounting base, roller bearing elements 8 are arranged in accordance with the present invention between the counter mass 3 and the mounting base 7. Because of their special design they act for an optimal vibration insulation and damping. Two roller parts 10 are arranged between two oppositely located bearing shells 9. The roller part 10 can be either balls or rollers. Advantageously they are formed of rubber or synthetic plastic material so as to provide an additional damping. The bearing shells 9 can also be composed of a synthetic plastic material or a hard rubber. Running tracks 11 for the roller parts 10 in the bearing shells 9 extend in the conveying direction of the vibrating conveyor. The running tracks 11 reach the ends of the bearing shells 9 and a curve 13 provided between the roller parts 10, so that during the vibrations the roller parts 10 are pressed from one another during free rolling on the running tracks 11 of the bearing shells 9 and thereby the counter mass 3 is lifted relative to the mounting base 7. Thereby an approximately complete insulation of the disturbing vibrations in the horizontal direction transverse to the mounting base is obtained.

In the embodiment shown in FIG. 1 each roller bearing element has two roller parts. Instead, with the respective design of the bearing shells more roller parts can be provided when this is required or suitable. In FIG. 1 one roller bearing element 8 is shown in a side view. The lateral limit of the running track 11 prevents a lateral "traveling" of the upper bearing shell relative to the lower bearing shell during the vibrations or a lateral sliding-out of the roller.

FIG. 3 shows a second embodiment of the present invention which operates on the same principle as the first embodiment. In contrast to the first embodiment, the second embodiment deals with a rotatable vibrating conveyor in which the workpiece is transported via a circular track 12. The latter raises in form of a conveying coil in a helical manner. The working mass 1 is also connected via flat springs 2' with a counter mass 3'. The drive for the second embodiment is not shown. Between the counter mass 3 and a mounting base 7' a plurality of roller bearing elements 8' are provided. They are arranged uniformly on the periphery of the counter mass 3 under the latter.

FIG. 4 shows such a roller bearing element 8' on an enlarged scale. A conical roller 15 is arranged between the bearing shells 14. The lateral limits of a running track 11' maintain the conical roller in a working region. The roller bearing elements in this embodiment are shown here only in principle. There are a plurality of structural possibilities to provide a connection between the bearing shells for example for the transportation.

The described damping or insulating device is not limited to the above shown vibration examples. It can be used in general where there are comparable problems of the vibration damping and/or insulation take place.

It will be understood that each of the elements described above, or two or more together, may also find a useful application in other types of construction differing from the types described above.

While the invention has been illustrated and described as embodied in a vibrating conveyor it is not intended to be limited to the details show, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A vibrating conveyor, comprising a working mass driveable in vibrations in a predetermined direction and having a conveying surface for supporting a workpiece to be conveyed over a conveying path; drive means arranged to drive said working mass in vibrations for vibrating said working mass and said counter mass at least in a horizontal direction; a counter mass serving as a base body; a support surface on which said counter is mounted; connecting means for connecting said working mass with said colunter mass; and means provided between said counter mass and said support surface for vibration isolation and/or damping of horizontal vibratory forces, said means for vibration isolation and/or damping including a plurality of horizontally spaced units each having two oppositely facing vertically spaced bearing surfaces and a roller element positioned to freely rotate therebetween, said bearing surfaces each being formed symmetrically about a vertical plane which extends perpendicular to the conveying path, at least one of said bearing surfaces being concave.

2. A vibrating conveyor as defined in claim 1, wherein said at least one bearing surface has two portions which are united with one another in form of a curve.

3. A vibrating conveyor as defined in claim 2, wherein each of said units is provided with two further such oppositely facing vertically spaced bearing surfaces with at least one of said further bearing surfaces being concave, each of said units being formed with an increasing raised formation provided between said one concave bearing surface and said one further concave bearing surface.

4. A a vibrating conveyor as defined in claim 1, wherein said bearing surfaces and said roller elements form first and second members, respectively, at least one of said members being composed of an elastic material.

5. A vibrating conveyor as defined in claim 4, wherein all said members are composed of an elastic material.

6. A vibrating conveyor as defined in claim 4, wherein said elastic material is selected from the group consisting of a rubber and a synthetic plastic material.

7. A vibrating conveyor as defined in claim 1, wherein said working mass is rotatable relative to said surface about an axis so as to form a rotatable vibrating conveyor, said roller element being formed as a conical roller extending in a substantially radial direction.

* * * * *